(12) United States Patent
Brooks et al.

(10) Patent No.: US 12,465,219 B2
(45) Date of Patent: Nov. 11, 2025

(54) DEVICES, METHODS AND SYSTEMS FOR EAR-BASED PHOTOACOUSTIC PLETHYSMOGRAPHY

(71) Applicant: QUALCOMM Incorporated, San Diego, CA (US)

(72) Inventors: Emily Kathryn Brooks, Amherst, NY (US); John Keith Schneider, Williamsville, NY (US); Nicholas Buchan, San Jose, CA (US); Evan Michael Breloff, Kenmore, NY (US); Ye Zhan, Buffalo, NY (US); Vivekananda Parampalli Adiga, Williamsville, NY (US); Shounak Uday Gore, Telangana (IN)

(73) Assignee: QUALCOMM Incorporated, San Diego, CA (US)

( * ) Notice: Subject to any disclaimer, the term of this patent is extended or adjusted under 35 U.S.C. 154(b) by 229 days.

(21) Appl. No.: 18/339,170

(22) Filed: Jun. 21, 2023

(65) Prior Publication Data

US 2024/0423479 A1    Dec. 26, 2024

(51) Int. Cl.
 *A61B 5/00* (2006.01)
 *A61B 5/021* (2006.01)
(52) U.S. Cl.
 CPC ............ *A61B 5/0095* (2013.01); *A61B 5/021* (2013.01); *A61B 5/6817* (2013.01)

(58) Field of Classification Search
 CPC ...... A61B 5/0095; A61B 5/021; A61B 5/6817
 See application file for complete search history.

(56) References Cited

U.S. PATENT DOCUMENTS

| 2008/0146890 A1* | 6/2008 | LeBoeuf | A61B 5/4839 |
| | | | 600/300 |
| 2017/0014056 A1* | 1/2017 | Newberry | A61B 5/1455 |
| 2022/0416579 A1* | 12/2022 | David | H02J 50/10 |

FOREIGN PATENT DOCUMENTS

WO    WO-2016153067 A1 *    9/2016    ........... A61B 5/0095

* cited by examiner

*Primary Examiner* — Rochelle D Turchen
(74) *Attorney, Agent, or Firm* — QUALCOMM Incorporated

(57) ABSTRACT

An apparatus may be configured to control a light source system residing in or on a first support structure portion of the apparatus to transmit light through an ear volume residing between a first ear portion and a second ear portion. The apparatus may be configured to receive, from a receiver system residing in or on a second support structure portion of the apparatus proximate the second ear portion, receiver system signals corresponding to acoustic waves caused by a photoacoustic response to light emitted by the light source system of a) a blood vessel residing within the ear volume, b) blood within the blood vessel, or a combination thereof. The control system may be configured to estimate one or more cardiac features based, at least in part, on the receiver system signals.

25 Claims, 9 Drawing Sheets

DEVICES, METHODS AND SYSTEMS FOR EAR-BASED PHOTOACOUSTIC PLETHYSMOGRAPHY

TECHNICAL FIELD

This disclosure relates generally to devices for estimating cardiac features and more specifically to estimating cardiac features with photoacoustic plethysmography (PAPG)-capable devices.

DESCRIPTION OF RELATED TECHNOLOGY

A variety of different sensing technologies and algorithms are being implemented in devices for various biometric and biomedical applications, including health and wellness monitoring. This push is partly a result of the limitations in the usability of traditional measuring devices for continuous, noninvasive and ambulatory monitoring. Some such devices may be, or include, photoacoustic devices. Although some previously-deployed devices and systems can provide acceptable results, improved devices and systems would be desirable.

SUMMARY

The systems, methods and devices of this disclosure each have several aspects, no single one of which is solely responsible for the desirable attributes disclosed herein.

One innovative aspect of the subject matter described in this disclosure can be implemented in an apparatus. The apparatus may include a light source system and a receiver system. The receiver system may be, or may include, an ultrasonic receiver system. In some implementations, a mobile device (such as a wearable device, a cellular telephone, etc.) may be, or may include, at least part of the apparatus.

According to some examples, the apparatus may include a support structure configured to be worn in or on a human ear. In some examples, the light source system may include a light-emitting component residing in or on a first support structure portion configured to contact a first ear portion on a first side of the human ear. The light source system may be configured to transmit light from the light-emitting component through an ear volume residing between the first ear portion and a second ear portion in or on which one or more receiver elements of the receiver system resides. The receiver system may be configured to detect acoustic waves corresponding to a photoacoustic response to light emitted by the light source system of a) a blood vessel residing within the ear volume, b) blood within the blood vessel, or a combination thereof.

In some examples, the first ear portion or the second ear portion may be a posterior ear portion. According to some examples, the first support structure portion or the second support structure portion may be configured to reside within an ear canal. In some examples, the first support structure portion or the second support structure portion may be configured to reside proximate, or within, an ear concha. According to some examples, the first support structure portion may be configured to reside proximate a first side of an ear lobe and the second support structure portion may be configured to reside proximate a second side of the ear lobe. In some examples, the blood vessel may be an artery.

According to some examples, the apparatus may include an interface system, including a wireless interface configured for communication with one or more other devices. In some examples, the apparatus may be configured to transmit electromagnetic signals via the wireless interface. The electromagnetic signals may, in some examples, include receiver system signals corresponding to the acoustic waves.

In some examples, the apparatus may include a control system including one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. In some examples, the control system may be configured to estimate one or more cardiac features based, at least in part, on receiver system signals corresponding to the acoustic waves. According to some examples, at least one of the one or more cardiac features may be blood pressure.

According to some examples, the apparatus may include at least one loudspeaker. In some examples, the at least one loudspeaker may include at least one piezoelectric-based loudspeaker, at least one micro-electromechanical systems (MEMS)-based loudspeaker, or at least one capacitive-based loudspeaker. In some examples, the at least one loudspeaker may include at least one bone conduction loudspeaker or at least one near-field loudspeaker. In some examples, the control system may be configured to control the at least one loudspeaker to play back audio content.

In some examples, the apparatus may include at least one microphone. According to some examples, the control system may be configured to control the at least one loudspeaker to provide hearing aid functionality that is based, at least in part, in microphone signals received from the at least one microphone.

Other innovative aspects of the subject matter described in this disclosure can be implemented in one or more methods. Some such methods may involve controlling a light source system residing in or on a first support structure portion of an apparatus to transmit light through an ear volume residing between a first ear portion and a second ear portion and receiving, from a receiver system residing in or on a second support structure portion of the apparatus proximate the second ear portion, receiver system signals corresponding to acoustic waves caused by a photoacoustic response to light emitted by the light source system of a) a blood vessel residing within the ear volume, b) blood within the blood vessel, or a combination thereof.

In some examples, the first ear portion or the second ear portion may be a posterior ear portion. According to some examples, the first support structure portion or the second support structure portion may be configured to reside within an ear canal. In some examples, the first support structure portion or the second support structure portion may be configured to reside proximate, or within, an ear concha. According to some examples, transmitting light through the ear volume may involve transmitting light through an ear lobe. In some examples, the method may involve estimating one or more cardiac features based, at least in part, on the receiver system signals. According to some examples, at least one of the one or more cardiac features may be blood pressure.

Some or all of the methods described herein may be performed by one or more devices according to instructions (e.g., software) stored on non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon. The software may include instructions for controlling one or more devices to perform one or more disclosed methods.

Some such methods may involve controlling a light source system residing in or on a first support structure portion of an apparatus to transmit light through an ear volume residing between a first ear portion and a second ear portion and receiving, from a receiver system residing in or on a second support structure portion of the apparatus proximate the second ear portion, receiver system signals corresponding to acoustic waves caused by a photoacoustic response to light emitted by the light source system of a) a blood vessel residing within the ear volume, b) blood within the blood vessel, or a combination thereof.

In some examples, the first ear portion or the second ear portion may be a posterior ear portion. According to some examples, the first support structure portion or the second support structure portion may be configured to reside within an ear canal. In some examples, the first support structure portion or the second support structure portion may be configured to reside proximate, or within, an ear concha. According to some examples, transmitting light through the ear volume may involve transmitting light through an ear lobe. In some examples, the method may involve estimating one or more cardiac features based, at least in part, on the receiver system signals. According to some examples, at least one of the one or more cardiac features may be blood pressure.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
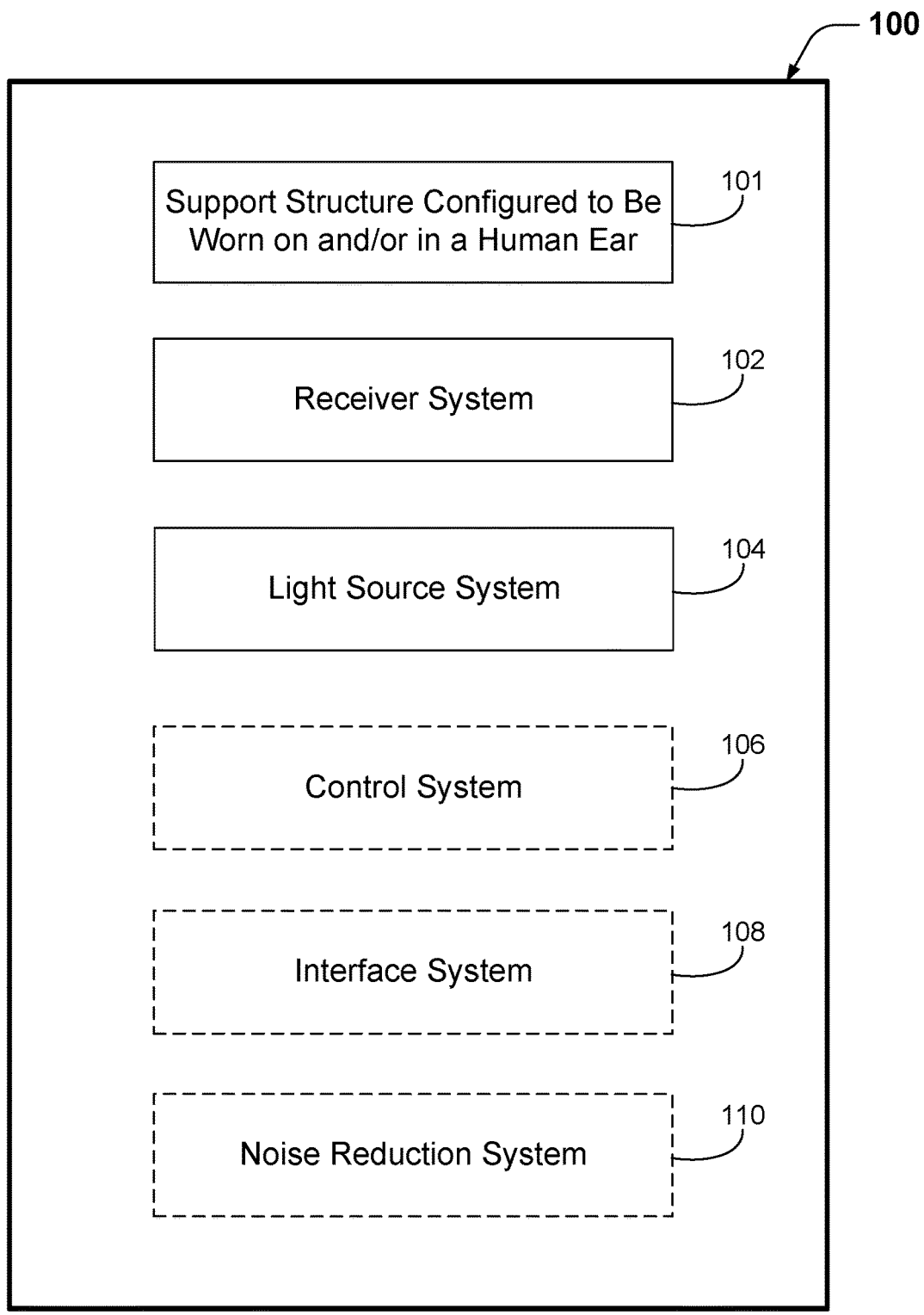
FIG. 1 is a block diagram that shows example components of an apparatus according to some disclosed implementations.

The following description is directed to certain implementations for the purposes of describing various aspects of this disclosure. However, a person having ordinary skill in the art will readily recognize that the teachings herein can be applied in a multitude of different ways. Some of the concepts and examples provided in this disclosure are especially applicable to blood pressure monitoring applications. However, some implementations also may be applicable to other types of biological sensing applications, as well as to other fluid flow systems. The described implementations may be implemented in any device, apparatus, or system that includes an apparatus as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, handheld or portable computers, netbooks, notebooks, smartbooks, tablets, printers, copiers, scanners, facsimile devices, global positioning system (GPS) receivers/navigators, cameras, digital media players, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), architectural structures, microwaves, refrigerators, stereo systems, cassette recorders or players, DVD players, CD players, VCRs, radios, portable memory chips, washers, dryers, washer/dryers, parking meters, automobile doors, autonomous or semi-autonomous vehicles, drones, Internet of Things (IoT) devices, etc. Thus, the teachings are not intended to be limited to the specific implementations depicted and described with reference to the drawings; rather, the teachings have wide applicability as will be readily apparent to persons having ordinary skill in the art.

Non-invasive health monitoring devices have various potential advantages over more invasive health monitoring devices such as cuff-based or catheter-based blood pressure measurement devices. However, it has proven to be difficult to design satisfactory wearable devices that are capable of estimating cardiac-related features, such as blood pressure. The present assignee has developed various types of useful wearable devices that are capable of estimating cardiac-related features, including but not limited to ultrasonic devices and photoacoustic plethysmography (PAPG)-capable devices. These devices are often designed to be worn on a finger, on a wrist, on an arm or combinations thereof. One challenge of obtaining accurate blood pressure estimations with such wearable devices is that the position of the finger, the arm or the wrist relative to the heart may change significantly in a relatively short time, such as while the wearer is walking, running, doing house work, etc. Moreover, arms, wrists and fingers have bones, which scatter acoustic signals. Therefore, the transmitters and receivers of such devices are normally positioned on the same side of the device, which makes it more difficult to make such devices in a compact form factor.

Some disclosed devices may include a support structure configured to be worn in or on a human ear (or both). The apparatus may include a light source system and a receiver system. The receiver system may be, or may include, an ultrasonic receiver system. According to some examples, the light source system may include a light-emitting component residing in or on a first support structure portion configured to contact a first ear portion on a first side of the human ear. In some examples, the light source system may be configured to transmit light from the light-emitting component through an ear volume residing between the first ear portion and a second ear portion in or on which one or more receiver elements of the receiver system resides. The receiver system may be configured to detect acoustic waves corresponding to a photoacoustic response to light emitted by the light source system of a) a blood vessel residing within the ear volume, b) blood within the blood vessel, or a combination thereof. Some alternative implementations may include an ultrasonic transmitter on or in the first support structure portion.

Particular implementations of the subject matter described in this disclosure can be implemented to realize one or more of the following potential advantages. Some disclosed implementations are configured to detect acoustic waves corresponding to a photoacoustic response of material within an ear volume that does not include bone. Therefore, such implementations have the advantage of avoiding problems relating to the scattering of acoustic energy by bone material. One such advantage is that the transmitting portion(s)—for example, the light-emitting portion(s))—and the receiving portion(s) of the device do not need to be on the same side of the ear volume. Another potential advantage is that a device configured to be worn in and/or on a human ear will generally maintain a more consistent position relative to the heart of the person using the device, as compared to a device configured to be worn on a wrist, an arm or a finger. Another potential advantage is that a device configured to be worn in a human ear will generally maintain a more consistent temperature, relative to the temperature of a device configured to be worn on a wrist, an arm or a finger. Various disclosed configurations are capable of obtaining accurate measurements of one or more blood vessel features such as blood vessel diameter, blood vessel distension, etc. Accordingly, measurements from such devices may be used to obtain accurate estimates of blood pressure.

FIG. 1 is a block diagram that shows example components of an apparatus according to some disclosed implementations. In this example, the apparatus 100 includes a support structure 101 that is configured to be worn in a human ear, on a human ear, or both. According to this example, the apparatus 100 also includes a receiver system 102 and a light source system 104. Some implementations of the apparatus 100 may include a control system 106, an interface system 108, a noise reduction system 110, or combinations thereof. As with other disclosed implementations, in some alternative implementations the apparatus 100 may include more components, fewer components, different components, or combinations thereof. For example, some implementations of the apparatus 100 may include an ultrasonic transmitter system instead of, or in addition to, the light source system 104.

In some implementations, the support structure 101 may include a first support structure portion and a second ear portion. According to some examples, the first support structure portion may be configured to contact a first ear portion on a first side of a human ear and the second support structure portion may be configured to contact a second ear portion on a second side of the human ear. The second side may be opposite the first side. An ear volume may reside between the first ear portion and the second ear portion.

According to some examples, the support structure 101 (or another portion of the apparatus) may include one or more anti-reflective layers. In some examples, one or more anti-reflective layers may reside on, or proximate, one or more outer surfaces of the support structure 101.

In some examples, at least a portion of the outer surface of the support structure 101 may have an acoustic impedance that is configured to approximate an acoustic impedance of human skin. A typical range of acoustic impedances for human skin is 1.53-1.680 MRayls. In some examples, at least an outer surface of the support structure 101 may have an acoustic impedance that is in the range of 1.4-1.8 MRayls, or in the range of 1.5-1.7 MRayls.

Alternatively, or additionally, in some examples at least an outer surface of the support structure 101 may be configured to conform to a surface of human skin. In some such examples, at least an outer surface of the support structure 101 may have material properties like those of putty or chewing gum.

In some examples, the receiver system 102 may include one or more ultrasonic receiver elements. Various examples and configurations of receiver systems 102 are disclosed herein. In some examples, the receiver system 102 may include an array of ultrasonic receiver elements. In some such examples, the receiver system 102 may include a linear array of ultrasonic receiver elements. According to some examples, the receiver system 102 may include a two-dimensional array of ultrasonic receiver elements. In some examples, the receiver system 102 may include an array of electrodes arranged on a piezoelectric receiver layer, such as a layer of PVDF polymer, a layer of PVDF-TrFE copolymer, or a layer of piezoelectric composite material. In some implementations, other piezoelectric materials may be used in the piezoelectric layer, such as aluminum nitride (AlN) or lead zirconate titanate (PZT). The receiver system 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, a piezoelectric receiver layer, PMUT elements in a single-layer array of PMUTs, or CMUT elements in a single-layer array of CMUTs, may be used as ultrasonic transmitters as well as ultrasonic receivers. In some examples, the apparatus 100 may include one or more separate ultrasonic transmitter elements. In some such examples, the ultrasonic transmitter(s) may include an ultrasonic plane-wave generator.

According to some implementations, the light source system 104 may include one or more light-emitting diodes (LEDs). In some implementations, the light source system 104 may include one or more laser diodes. According to some implementations, the light source system 104 may include one or more vertical-cavity surface-emitting lasers (VCSELs). In some implementations, the light source system 104 may include one or more edge-emitting lasers. In some implementations, the light source system may include one or more neodymium-doped yttrium aluminum garnet (Nd:YAG) lasers. The light source system 104 may, in some examples, include an array of light-emitting elements, such as an array of LEDs, an array of laser diodes, an array of VCSELs, an array of edge-emitting lasers, or combinations thereof.

The light source system 104 may, in some examples, be configured to transmit light in one or more wavelength ranges. In some examples, the light source system 104 may configured for transmitting light in a wavelength range of 500 to 600 nanometers. According to some examples, the light source system 104 may configured for transmitting light in a wavelength range of 800 to 950 nanometers.

The light source system 104 may include various types of drive circuitry, depending on the particular implementation. In some disclosed implementations, the light source system 104 may include at least one multi-junction laser diode, which may produce less noise than single-junction laser diodes. In some examples, the light source system 104 may include a drive circuit (also referred to herein as drive circuitry) configured to cause the light source system to emit pulses of light at pulse widths in a range from 3 nanoseconds to 1000 nanoseconds. According to some examples, the light source system 104 may include a drive circuit configured to cause the light source system to emit pulses of light at pulse repetition frequencies in a range from 1 kilohertz to 100 kilohertz.

In some implementations, the light source system 104 may be configured for emitting various wavelengths of light, which may be selectable to trigger acoustic wave emissions primarily from a particular type of material. For example, because the hemoglobin in blood absorbs near-infrared light very strongly, in some implementations the light source system 104 may be configured for emitting one or more wavelengths of light in the near-infrared range, in order to trigger acoustic wave emissions from hemoglobin. However, in some examples the control system 106 may control the wavelength(s) of light emitted by the light source system 104 to preferentially induce acoustic waves in blood vessels, other soft tissue, and/or bones. For example, an infrared (IR) light-emitting diode LED may be selected and a short pulse of IR light emitted to illuminate a portion of a target object and generate acoustic wave emissions that are then detected by the receiver system 102. In another example, an IR LED and a red LED or other color such as green, blue, white or ultraviolet (UV) may be selected and a short pulse of light emitted from each light source in turn with ultrasonic images obtained after light has been emitted from each light source. In other implementations, one or more light sources of different wavelengths may be fired in turn or simultaneously to generate acoustic emissions that may be detected by the ultrasonic receiver. Image data from the ultrasonic receiver that is obtained with light sources of different wavelengths and at different depths (e.g., varying RGDs) into the target object may be combined to determine the location and type of material in the target object. Image contrast may occur as materials in the body generally absorb light at different wavelengths differently. As materials in the body absorb light at a specific wavelength, they may heat differentially and generate acoustic wave emissions with sufficiently short pulses of light having sufficient intensities. Depth contrast may be obtained with light of different wavelengths and/or intensities at each selected wavelength. That is, successive images may be obtained at a fixed RGD (which may correspond with a fixed depth into the target object) with varying light intensities and wavelengths to detect materials and their locations within a target object. For example, hemoglobin, blood glucose or blood oxygen within a blood vessel inside a target object such as a finger may be detected photoacoustically.

According to some implementations, the light source system 104 may be configured for emitting a light pulse with a pulse width less than about 100 nanoseconds. In some implementations, the light pulse may have a pulse width between about 10 nanoseconds and about 500 nanoseconds or more. According to some examples, the light source system may be configured for emitting a plurality of light pulses at a pulse repetition frequency between 10 Hz and 100 kHz. Alternatively, or additionally, in some implementations the light source system 104 may be configured for emitting a plurality of light pulses at a pulse repetition frequency between about 1 MHz and about 100 MHZ. Alternatively, or additionally, in some implementations the light source system 104 may be configured for emitting a plurality of light pulses at a pulse repetition frequency between about 10 Hz and about 1 MHZ. In some examples, the pulse repetition frequency of the light pulses may correspond to an acoustic resonant frequency of the ultrasonic receiver and the substrate. For example, a set of four or more light pulses may be emitted from the light source system 104 at a frequency that corresponds with the resonant frequency of a resonant acoustic cavity in the sensor stack, allowing a build-up of the received ultrasonic waves and a higher resultant signal strength. In some implementations, filtered light or light sources with specific wavelengths for detecting selected materials may be included with the light source system 104. In some implementations, the light source system may contain light sources such as red, green and blue LEDs of a display that may be augmented with light sources of other wavelengths (such as IR and/or UV) and with light sources of higher optical power. For example, high-power laser diodes or electronic flash units (e.g., an LED or xenon flash unit) with or without filters may be used for short-term illumination of the target object.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 106 also may include (and/or be configured for communication with) one or more memory devices, such as one or more random access memory (RAM) devices, read-only memory (ROM) devices, etc. Accordingly, the apparatus 100 may have a memory system that includes one or more memory devices, though the memory system is not shown in FIG. 1. The control system 106 may be configured for receiving and processing data from the receiver system 102, e.g., as described below. If the apparatus 100 includes an ultrasonic transmitter, the control system 106 may be configured for controlling the ultrasonic transmitter. In some implementations, functionality of the control system 106 may be partitioned between one or more controllers or processors, such as a dedicated sensor controller and an applications processor of a mobile device.

In some examples, the control system 106 may be configured to control the light source system 104 to emit light towards a target object or portion thereof, such as an ear volume within the ear of a person wearing the apparatus 100. In some such examples, the control system 106 may be configured to receive receiver system signals from the receiver system 102 corresponding to ultrasonic waves generated by the target object—for example, within the ear volume—responsive to the light from the light source system 104.

According to some examples, the control system 106 may be configured to estimate one or more blood vessel features based on the receiver system signals. The blood vessel feature(s) may include blood vessel diameter, blood vessel distension, volumetric flow, or combinations thereof.

In some examples, the control system 106 may be configured to receive second sensor signals from a second sensor, or from a second sensor system. The second sensor signals may be, or may include, signals from a photoplethysmography sensor, signals from a photoacoustic plethysmography sensor, microphone signals, signals from an accelerometer, capacitive sensor signals, signals from a radio frequency sensor, signals from a magnetic sensor, electrocardiogram signals, signals from an ultrasonic sensor, signals from a pressure sensor, signals from a camera, or combinations thereof. According to some examples the second sensor, or the second sensor system, may be part of the same apparatus that includes the receiver system 102. However, in other examples the second sensor, or the second sensor system, may be part of another apparatus. In some such examples, the second sensor signals may be, or may include, signals from a sensor array, signals from a receiver array, etc. The array may, in some examples, be a two-dimensional array.

According to some examples, the control system 106 may be configured to estimate a pulse wave velocity based, at least in part, on the receiver system signals and the second sensor signals. In some examples, the control system 106 may be configured to estimate one or more cardiac features based, at least in part, on the one or more blood vessel features and the pulse wave velocity. According to some examples, the cardiac features may be, or may include, blood pressure.

Some implementations of the apparatus 100 may include the interface system 108. In some examples, the interface system 108 may include a wireless interface system. In some implementations, the interface system 108 may include a user interface system, one or more network interfaces, one or more interfaces between the control system 106 and a memory system and/or one or more interfaces between the control system 106 and one or more external device interfaces (e.g., ports or applications processors), or combinations thereof. According to some examples in which the interface system 108 is present and includes a user interface system, the user interface system may include a microphone system, a loudspeaker system, a haptic feedback system, a voice command system, one or more displays, or combinations thereof. According to some examples, the interface system 108 may include a touch sensor system, a gesture sensor system, or a combination thereof. The touch sensor system (if present) may be, or may include, a resistive touch sensor system, a surface capacitive touch sensor system, a projected capacitive touch sensor system, a surface acoustic wave touch sensor system, an infrared touch sensor system, any other suitable type of touch sensor system, or combinations thereof.

In some examples, the interface system 108 may include, a force sensor system. The force sensor system (if present) may be, or may include, a piezo-resistive sensor, a capacitive sensor, a thin film sensor (for example, a polymer-based thin film sensor), another type of suitable force sensor, or combinations thereof. If the force sensor system includes a piezo-resistive sensor, the piezo-resistive sensor may include silicon, metal, polysilicon, glass, or combinations thereof. An ultrasonic fingerprint sensor and a force sensor system may, in some implementations, be mechanically coupled. In some such examples, the force sensor system may be integrated into circuitry of the ultrasonic fingerprint sensor. In some examples, the interface system 108 may include an optical sensor system, one or more cameras, or a combination thereof.

According to some examples, the apparatus 100 may include a noise reduction system 110. For example, the noise reduction system 110 may include one or more mirrors that are configured to reflect light from the light source system 104 away from the receiver system 102. In some implementations, the noise reduction system 110 may include one or more sound-absorbing layers, acoustic isolation material, light-absorbing material, light-reflecting material, or combinations thereof. In some examples, the noise reduction system 110 may include one or more electromagnetically shielded transmission wires. In some such examples, the one or more electromagnetically shielded transmission wires may be configured to reduce electromagnetic interference from circuitry of the light source system 104, receiver system circuitry, or combinations thereof, that is received by the receiver system 102. In some examples, the one or more electromagnetically shielded transmission wires, sound-absorbing layers, acoustic isolation material, light-absorbing material, light-reflecting material, or combinations thereof may be components of the receiver system 102, the light source system 104, or both. Despite the fact that the receiver system 102, the light source system 104 and the noise reduction system 110 are shown in FIG. 1 as being separate elements, such components may nonetheless be regarded as elements of the noise reduction system 110.

The apparatus 100 may be used in a variety of different contexts, many examples of which are disclosed herein. In some implementations, the apparatus 100 may include one or more other device portions, such as a bracelet, one or more devices configured to be attached to an arm, such as an armband or an arm strap, one or more devices configured to be attached to a wrist, such as a wristband or a watch, one or more devices configured to be attached to a finger, such as a ring or a finger strap, a headband, one or more ear buds, headphones, one or more ear clips, a chest strap, eye wear—such as glasses or goggles—or a patch. Accordingly, in some examples one or more additional components of the apparatus 100—or of a system that includes the apparatus 100—may also be configured to be worn by, or attached to, a person.

However, in some examples, at least a portion of the apparatus 100—or of a system that includes the apparatus 100—may not be configured to be worn by, or attached to, a person. For example, in some implementations a system that includes the apparatus 100 also may include a mobile device. In some such examples, the mobile device may be, or may include, a smart phone.

Figure 2:
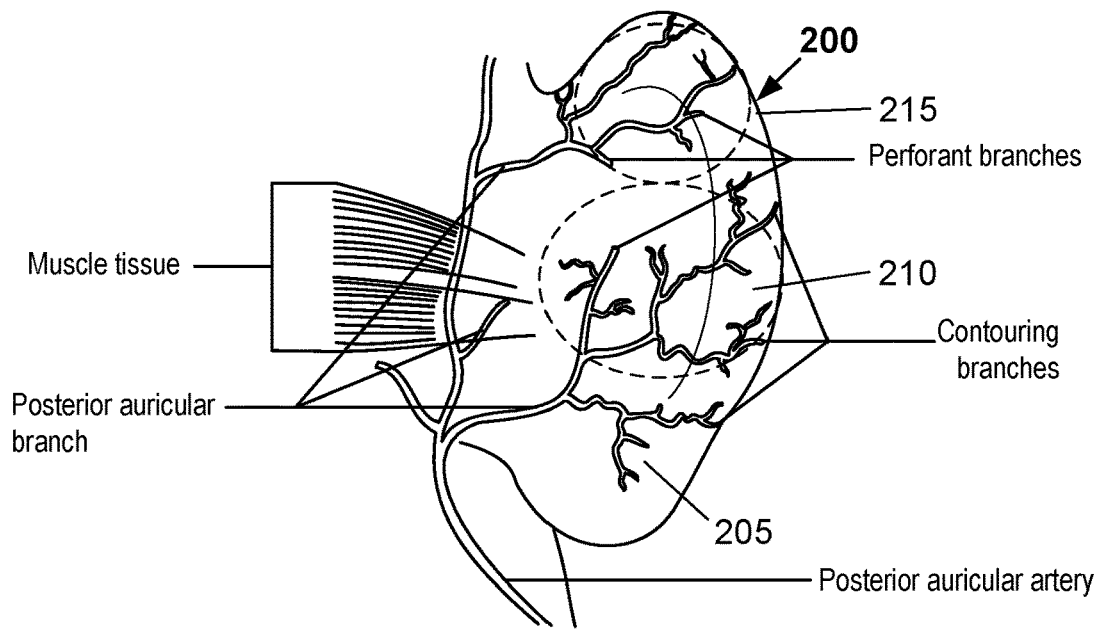
FIG. 2 shows examples of muscles and blood vessels in and near the back of a human ear.

FIG. 2 shows examples of muscles and blood vessels in and near the back of a human ear. FIG. 2 shows examples of muscle tissue attached to the posterior area of the ear 200, the posterior auricular artery, and branches thereof. Accordingly, FIG. 2 shows various examples of arteries, and branches thereof, near which receiver elements of the receiver system 102, one or more light-emitting components of the light source system 104, or both, may reside. In some such examples, the receiver elements and the light-emitting components may both reside within the support structure 101 in positions such that, when the apparatus 100 is worn in or on the ear 200, both the receiver elements and the light-emitting components are positioned proximate the same branch of the posterior auricular artery, on opposite sides of an ear volume.

According to some examples the control system 106 (not shown) may receive sensor signals from two or more sensors located at different positions along a blood vessel and may be configured to estimate a PWV based, at least in part, on signals from two or more sensors. According to some such examples, the blood vessel may be the posterior auricular artery or a branch thereof.

Figure 3:
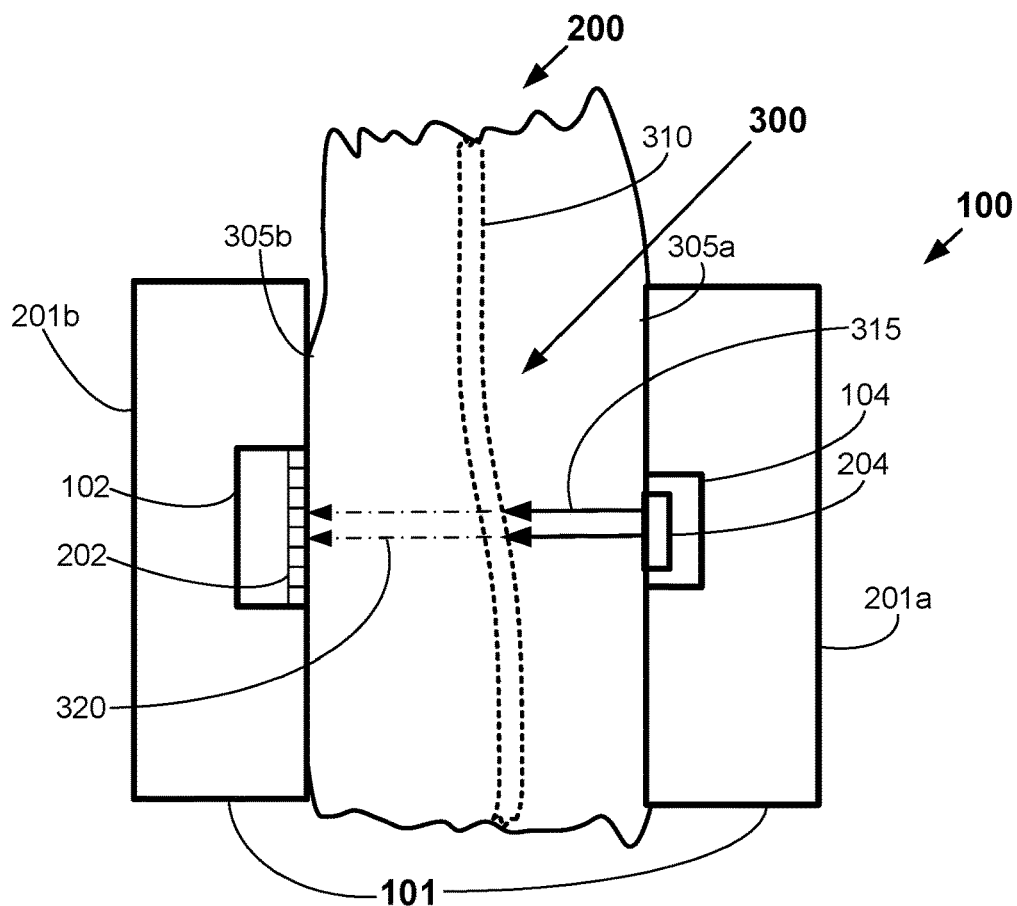
FIG. 3 shows components of an apparatus according to one example.

FIG. 3 shows components of an apparatus according to one example. In this example, the apparatus 100 includes instances of the support structure 101, the receiver system 102 and the light source system 104 of FIG. 1. According to this example, the apparatus 100 is configured to be worn in and/or on the ear 200. As with other disclosed examples, the types, numbers, sizes and arrangements of elements shown in FIG. 3 are merely examples.

Figures 4A, 4B:
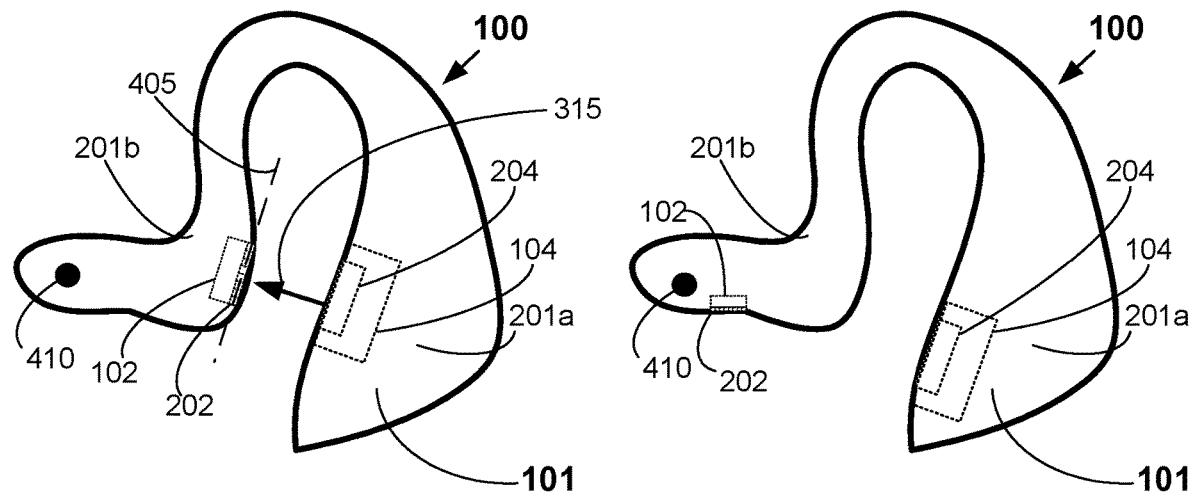
FIGS. 4A and 4B show components of an apparatus according two additional examples.
Figure 5:
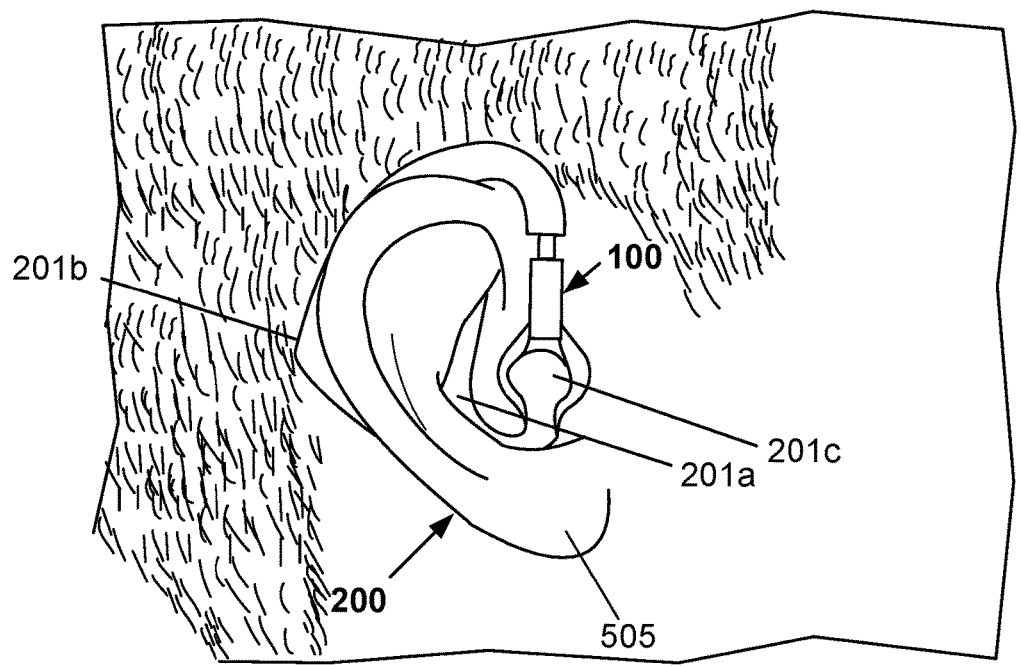
FIG. 5 shows components of an apparatus according to another example.

According to this example, the support structure 101 includes a first support structure portion 201a that is configured to contact a first ear portion 305a on a first side of the ear 200 and a second support structure portion 201b that is configured to contact a second ear portion 305b on a second side of the ear 200. In some examples, the first support structure portion 201a and the second support structure portion 201b may be connected by one or more other portions of the support structure 101 that are not shown in FIG. 3. In some such examples, the first support structure portion 201a and the second support structure portion 201b may be directly connected to one another by portions of the first support structure portion 201a and the second support structure portion 201b that are not shown in FIG. 3, such as shown in FIG. 4A or FIG. 5.

In this example, at least a portion of the light source system 104, including a light-emitting component 204, resides in the first support structure portion 201a. In some alternative examples, the light source system 104 may include an array of light-emitting components 204. According to this example, at least a portion of the receiver system 102, including an array of receiver elements 202, resides in the second support structure portion 201b. In some examples, the array of receiver elements 202 may be a linear array. According to some examples, the array of receiver elements 202 may be a two-dimensional array.

According to this example, an ear volume 300 resides between the first ear portion 305a and the second ear portion 305b. In this example, the ear volume 300 also resides between the first support structure portion 201a and the second support structure portion 201b. In this example, a blood vessel 310—which is an artery in this instance-resides within the ear volume 300. However, in this example no bone material resides within the ear volume 300. Depending on the particular implementation, the ear volume 300 may be part of the ear lobe 205 shown in FIG. 2, part of the middle ear 210, part of the upper ear 215, or some other part of the ear 200.

In this example, the light source system 104 is configured to transmit light 315 from the light-emitting component 204 through the first ear portion 305a and the ear volume 300, towards the second ear portion 305b. For example, the control system 106 (not shown in FIG. 3) may be configured to control the light source system 104 to transmit light 315 from the light-emitting component 204.

According to this example, some of the light 315 from the light-emitting component 204 causes a photoacoustic response in one or more walls of the blood vessel 310, a photoacoustic response in blood within the blood vessel 310, or a combination thereof. The photoacoustic response produces the acoustic waves 320. Accordingly, in this example the receiver system 102 is configured to detect acoustic waves 320 corresponding to a photoacoustic response to light 315 emitted by the light source system 104 of a) the blood vessel 310 residing within the ear volume 300, b) blood within the blood vessel 310, or a combination thereof. Because no bone material resides within the ear volume 300 in this example, the acoustic waves 320 are not scattered by bone material.

In some examples, the control system 106 (or the control system of another device with which the apparatus 100 is configured for communication) may be configured to estimate one or more cardiac features based, at least in part, on receiver system signals corresponding to the acoustic waves 320. In some such examples, at least one of the one or more cardiac features may be blood pressure.

FIGS. 4A and 4B show components of an apparatus according two additional examples. In these examples, the apparatus 100 includes instances of the support structure 101, the receiver system 102 and the light source system 104 of FIG. 1. According to these examples, the apparatus 100 is configured to be worn in and on a human ear. As with other disclosed examples, the types, numbers, sizes and arrangements of elements shown in FIGS. 4A and 4B are merely examples.

According to these examples, the support structure 101 includes a first support structure portion 201a that is configured to contact a first ear portion on a first side of the ear when the apparatus 100 is worn. According to these examples, the first side is a posterior side. In these examples, the support structure 101 includes a second support structure portion 201b that is configured to contact a second ear portion on a second side and opposite side of the ear. According to these examples, at least part of the second support structure portion 201b is configured to reside with an ear canal.

In these examples, at least a portion of the light source system 104, including a light-emitting component 204, resides in the first support structure portion 201a. In some alternative examples, the light source system 104 may include an array of light-emitting components 204. In some examples, the light source system 104 may include a light source and an optical fiber that is configured to convey light from the light source to the light-emitting component 204, or to an array of light-emitting components 204. In some alternative examples, at least a portion of the light source system 104, including the light-emitting component(s) 204, may resides in the second support structure portion 201b.

According to these examples, at least a portion of the receiver system 102, including an array of receiver elements 202, resides in the second support structure portion 201b. In some examples, the array of receiver elements 202 may be a linear array. According to some examples, the array of receiver elements 202 may be a two-dimensional array. In some alternative examples, at least a portion of the receiver system 102, including one or more receiver elements 202, may reside in the second support structure portion 201a.

In the example shown in FIG. 4A, the light-emitting component 204 resides in the first support structure portion 201a and the array of receiver elements 202 resides in the second support structure portion 201b such that the light-emitting component 204 emits light 315 in a direction that is nearly orthogonal to a plane 405 within which the array of receiver elements 202 resides. These relative orientations of the light-emitting component 204 and the array of receiver elements 202 may be potentially advantageous for imaging the photoacoustic responses within an ear volume that would reside between the light-emitting component 204 and the array of receiver elements 202 when the apparatus 100 is worn on and in a person's ear.

According to the example shown in FIG. 4B, the array of receiver elements 202 resides in a part of the second support structure portion 201b that is configured to reside within an ear canal when the apparatus 100 is worn on and in a person's ear. This configuration, and similar configurations, have various potential advantages. One potential advantage is that the in-ear temperature is much more constant than that of compared to that of a finger, arm or wrist. For example, the in-ear temperature is not as affected by daily activities such as washing hands, changing ambient temperatures, etc. Therefore, in-ear configurations provide a more stable temperature range for the receiver element(s) 202, which can result in more accurate health monitoring estimations (including but not limited to estimations of cardiac features).

Another potential advantage is the potentially better acoustic coupling for the receiver element(s) 202 that may be provided by in-ear configurations, in part due to the presence of ear wax. The ear wax may reduce or eliminate the need for acoustic gels or acoustic coupling layers for the apparatus 100.

In some implementations the apparatus 100 may include a temperature sensor system including at least one temperature sensor 410 residing in or on a part of the apparatus 100 that is configured to reside within an ear canal. Another potential advantage that may be provided by in-ear configurations is that temperature changes within the ear may be monitored via the in-ear temperature sensor 410. Such temperature changes may be used for detecting body temperature changes that may be caused by contagious diseases.

Another potential advantage that may be provided by in-ear configurations is that the receiver element(s) 202 may be used to measure low-frequency vibrations in the ear. According to some examples, such low-frequency vibrations may be used to monitor cardiac health, such as via methods relating to infrasonic hemodynography. In some implementations, the control system 106—or the control system of another device configured for communication with the apparatus 100—may be configured to receive receiver system signals corresponding to such low-frequency vibrations and to apply one or more methods relating to infrasonic hemodynography, such as those disclosed in Gilliam, et al., "In-Ear Infrasonic Hemodynography with a Digital Health device for Cardiovascular Monitoring Using the Human Audiome" (npj Digital Medicine (2022) 5:189), which is hereby incorporated by reference.

According to these examples, an ear volume will reside between the first support structure portion 201a and the second support structure portion 201b when a person wears the apparatus 100. In these examples, the light source system 104 is configured to transmit light from the light-emitting component 204 into the ear volume. At least some of the light from the light-emitting component 204 may cause a photoacoustic response in one or more walls of a blood vessel within the ear volume, in blood within the blood vessel, or a combination thereof. The receiver system 102 is configured to detect acoustic waves corresponding to the photoacoustic response.

In some examples, the control system 106 (not shown in FIGS. 4A and 4B) may be configured to estimate one or more cardiac features based, at least in part, on receiver system signals corresponding to the acoustic waves. In some such examples, at least one of the one or more cardiac features may be blood pressure.

According to some examples, the control system of another device with which the apparatus 100 is configured for communication may be configured to estimate one or more cardiac features based, at least in part, on receiver system signals corresponding to the acoustic waves. The other device may, for example, be a cell phone, a watch, a server, a laptop computer, a tablet, etc. In some examples, the other device may be configured to display one or more estimated cardiac features, such as heart rate, blood pressure, blood oxygen, etc. According to some such examples, the apparatus 100 may include a wireless interface configured for communication with one or more other devices. The wireless interface may, for example, be a component of the interface system 108 that is described herein with reference to FIG. 1. According to some such examples, the wireless interface may be a network interface. In some such examples, the apparatus 100 may be configured to transmit electromagnetic signals via the wireless interface. The electromagnetic signals may include receiver system signals corresponding to the acoustic waves.

In some examples, the apparatus 100 may include at least one loudspeaker. For example, a part of the second support structure portion 201b that is configured to reside with the ear canal may include at least one loudspeaker. According to some examples, the at least one loudspeaker may include at least one piezoelectric-based loudspeaker, at least one micro-electromechanical systems (MEMS)-based loudspeaker, or at least one capacitive-based loudspeaker. In some examples, the at least one loudspeaker may include at least one bone conduction loudspeaker or at least one near-field loudspeaker. According to some examples, the control system 106 may be configured to control the at least one loudspeaker to play back audio content. In some examples, the apparatus 100 may include at least one microphone. In some such examples, the control system may be configured to control the at least one loudspeaker to provide hearing aid functionality that is based, at least in part, in microphone signals received from the at least one microphone.

FIG. 5 shows components of an apparatus according to another example. In this example, the apparatus 100 includes instances of the support structure 101, the receiver system 102 and the light source system 104 of FIG. 1. According to this example, the apparatus 100 is configured to be worn in and on a human ear. As with other disclosed examples, the types, numbers, sizes and arrangements of elements shown in FIG. 5 are merely examples.

According to this example, the support structure 101 includes a first support structure portion 201a that is configured to contact a first ear portion on a first side of the ear 200. According to this example, the first ear portion is an ear concha. In this example, the support structure 101 includes a second support structure portion 201b that is configured to contact a second ear portion on a second side and opposite side of the ear 200. According to this example, the second side is a posterior side. In this example, the support structure 101 includes a third support structure portion 201c that is configured to reside with an ear canal.

In this example, at least a portion of the light source system 104, including one or more light-emitting components 204, resides either in the first support structure portion 201a or the second support structure portion 201b. According to this example, at least a portion of the receiver system 102, including an array of receiver elements 202, resides either in the first support structure portion 201a or the second support structure portion 201b. In this example, if the one or more light-emitting components 204 resides in the first support structure portion 201a, the array of receiver elements 202 resides in the second support structure portion 201b, and vice versa.

Implementations in which the receiver element(s) 202 reside in the second support structure portion 201b have potential advantages. One such advantage is that receiver element(s) 202 located behind the ear 200 can be used to capture ballistocardiogram (BCG) data, which correlate to cardiac output and blood pressure. In some such implementations, the control system 106—or the control system of a device configured for communication with the apparatus 100—may be configured to obtain receiver system signals corresponding to BCG data and to estimate one or more cardiac features based, at least in part, on the BCG data. In some such examples, the control system may be configured to perform some or all of the methods disclosed in He, et al., "The Ear As a Location for Wearable Vital Signs Monitoring" (Annual Int. Conf. IEEE Eng. Med. Biol. Soc. 2010; 2010:6389-92), which is hereby incorporated by reference.

According to this example, an ear volume resides between the first support structure portion 201a and the second support structure portion 201b when a person wears the apparatus 100. In this example, the light source system 104 is configured to transmit light from the light-emitting component 204 into the ear volume. At least some of the light from the light-emitting component 204 may cause a photoacoustic response in one or more walls of a blood vessel within the ear volume, in blood within the blood vessel, or a combination thereof. The receiver system 102 is configured to detect acoustic waves corresponding to the photoacoustic response.

In some examples, the control system 106 (not shown) may be configured to estimate one or more cardiac features based, at least in part, on receiver system signals corresponding to the acoustic waves. In some such examples, at least one of the one or more cardiac features may be blood pressure.

According to some examples, the control system of another device with which the apparatus 100 is configured for communication may be configured to estimate one or more cardiac features based, at least in part, on receiver system signals corresponding to the acoustic waves. According to some such examples, the apparatus 100 may include a wireless interface configured for communication with one or more other devices. The wireless interface may, for example, be a component of the interface system 108 that is described herein with reference to FIG. 1. In some such examples, the apparatus 100 may be configured to transmit electromagnetic signals via the wireless interface. The electromagnetic signals may include receiver system signals corresponding to the acoustic waves.

In some examples, the apparatus 100 may include at least one loudspeaker. For example, the third support structure portion 201c that is configured to reside with the ear canal may include at least one loudspeaker. According to some examples, the at least one loudspeaker may include at least one piezoelectric-based loudspeaker, at least one MEMS-based loudspeaker, or at least one capacitive-based loudspeaker. In some examples, the at least one loudspeaker may include at least one bone conduction loudspeaker or at least one near-field loudspeaker. According to some examples, the control system 106 may be configured to control the at least one loudspeaker to play back audio content. In some examples, the apparatus 100 may include at least one microphone. In some such examples, the control system may be configured to control the at least one loudspeaker to provide hearing aid functionality that is based, at least in part, in microphone signals received from the at least one microphone.

Figure 6:
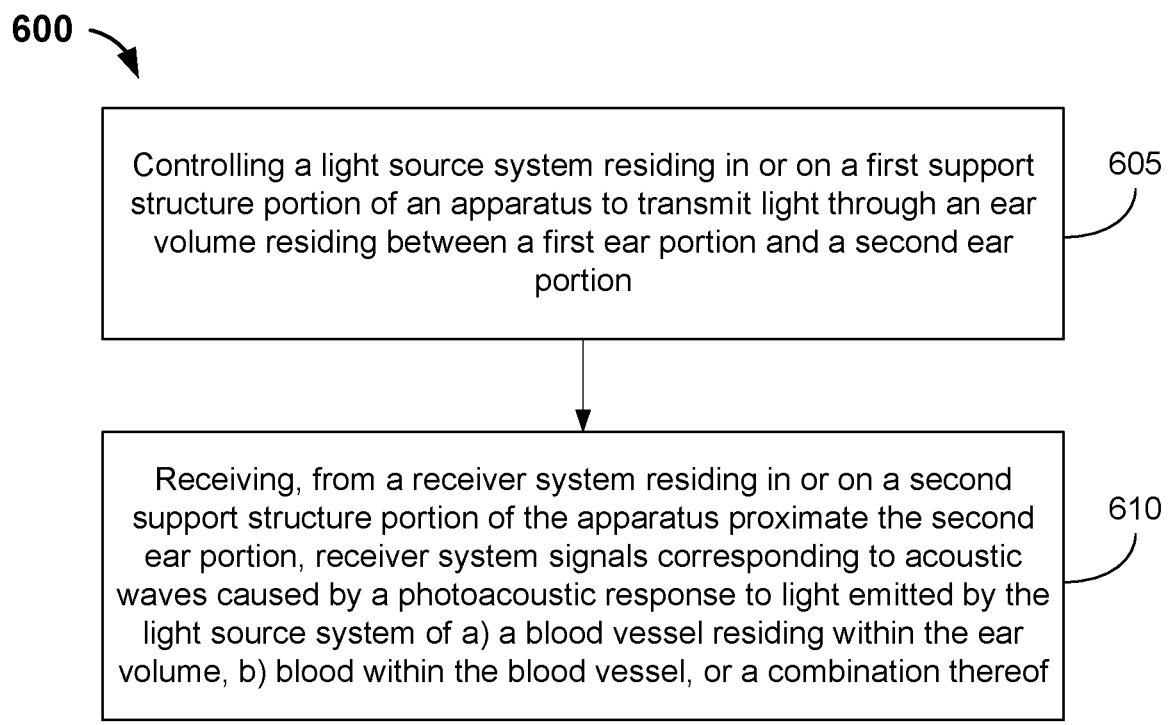
FIG. 6 is a flow diagram that shows examples of some disclosed operations.

FIG. 6 is a flow diagram that shows examples of some disclosed operations. The blocks of FIG. 6 may, for example, be performed by the apparatus 100 of FIG. 1 or by a similar apparatus. As with other methods disclosed herein, the method outlined in FIG. 6 may include more or fewer blocks than indicated. Moreover, the blocks of methods disclosed herein are not necessarily performed in the order indicated. In some instances, one or more of the blocks shown in FIG. 6 may be performed concurrently.

In this example, block 605 involves controlling a light source system residing in or on a first support structure portion of an apparatus to transmit light through an ear volume residing between a first ear portion and a second ear portion. The light source system may, for example, be any of the light source systems 104 that are disclosed herein. The first support structure portion may, for example, be any of the support structure portions 201a that are disclosed herein. In some examples, the ear volume may include a blood vessel, such as an artery.

According to this example, block 610 involves receiving, from a receiver system residing in or on a second support structure portion of the apparatus 100 proximate the second ear portion, receiver system signals corresponding to acoustic waves caused by a photoacoustic response to light emitted by the light source system of a) a blood vessel residing within the ear volume, b) blood within the blood vessel, or a combination thereof. The second support structure portion may, for example, be any of the support structure portions 201b that are disclosed herein.

According to some examples, the first ear portion or the second ear portion may be a posterior ear portion. In some examples, the first support structure portion or the second support structure portion may be configured to reside within an ear canal. According to some examples, the first support structure portion or the second support structure portion is configured to reside proximate, or within, an ear concha. In some examples, transmitting light through the ear volume may involve transmitting light through an ear lobe.

In some examples, method 600 may involve estimating one or more cardiac features based, at least in part, on the receiver system signals. According to some such examples, at least one of the one or more cardiac features may be blood pressure.

In some examples, method 600 may involve determining a PWV. In some such examples, estimating one or more cardiac features may be based, at least in part, on the PWV. According to some examples, method 600 may involve determining, or estimating, one or more blood vessel features based on the receiver system signals. The blood vessel feature(s) may include blood vessel diameter, blood vessel distension, volumetric flow, or combinations thereof. In some such examples, estimating one or more cardiac features may be based, at least in part, on the blood vessel feature(s). According to some examples, method 600 may involve extracting and evaluating heart rate waveform (HRW) features.

Figure 7:
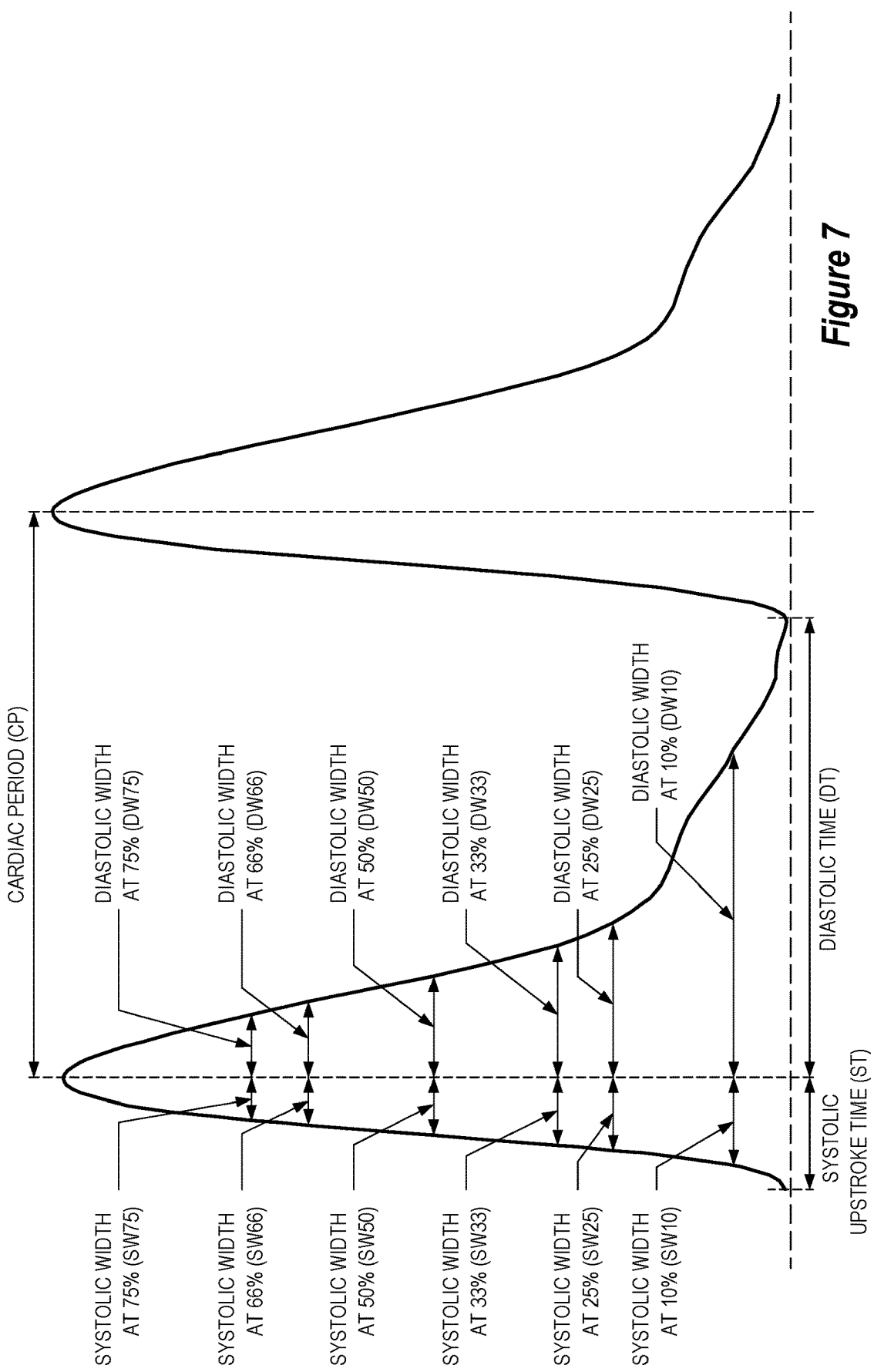
FIG. 7 shows examples of heart rate waveform (HRW) features that may be extracted according to some implementations of the method of FIG. 6.

FIG. 7 shows examples of heart rate waveform (HRW) features that may be extracted according to some implementations of the method of FIG. 6. The horizontal axis of FIG. 7 represents time and the vertical axis represents signal amplitude. The cardiac period is indicated by the time between adjacent peaks of the HRW. The systolic and diastolic time intervals are indicated below the horizontal axis. During the systolic phase of the cardiac cycle, as a pulse propagates through a particular location along an artery, the arterial walls expand according to the pulse waveform and the elastic properties of the arterial walls. Along with the expansion is a corresponding increase in the volume of blood at the particular location or region, and with the increase in volume of blood an associated change in one or more characteristics in the region. Conversely, during the diastolic phase of the cardiac cycle, the blood pressure in the arteries decreases and the arterial walls contract. Along with the contraction is a corresponding decrease in the volume of blood at the particular location, and with the decrease in volume of blood an associated change in the one or more characteristics in the region.

The HRW features that are illustrated in FIG. 7 pertain to the width of the systolic and/or diastolic portions of the HRW curve at various "heights," which are indicated by a percentage of the maximum amplitude. For example, the SW50 feature is the width of the systolic portion of the HRW curve at a "height" of 50% of the maximum amplitude. In some implementations, the HRW features used for blood pressure estimation may include some or all of the SW10, SW25, SW33, SW50, SW66, SW75, DW10, DW25, DW33, DW50, DW66 and DW75 HRW features. In other implementations, additional HRW features may be used for blood pressure estimation. Such additional HRW features may, in some instances, include the sum and ratio of the SW and DW at one or more "heights," e.g., (DW75+SW75), DW75/SW75, (DW66+SW66), DW66/SW66, (DW50+SW50), DW50/SW50, (DW33+SW33), DW33/SW33, (DW25+SW25), DW25/SW25 and/or (DW10+SW10), DW10/SW10. Other implementations may use yet other HRW features for blood pressure estimation. Such additional HRW features may, in some instances, include sums, differences, ratios and/or other operations based on more than one "height," such as (DW75+SW75)/(DW50+SW50), (DW50+SW50/(DW10+SW10), etc.

Figure 8:
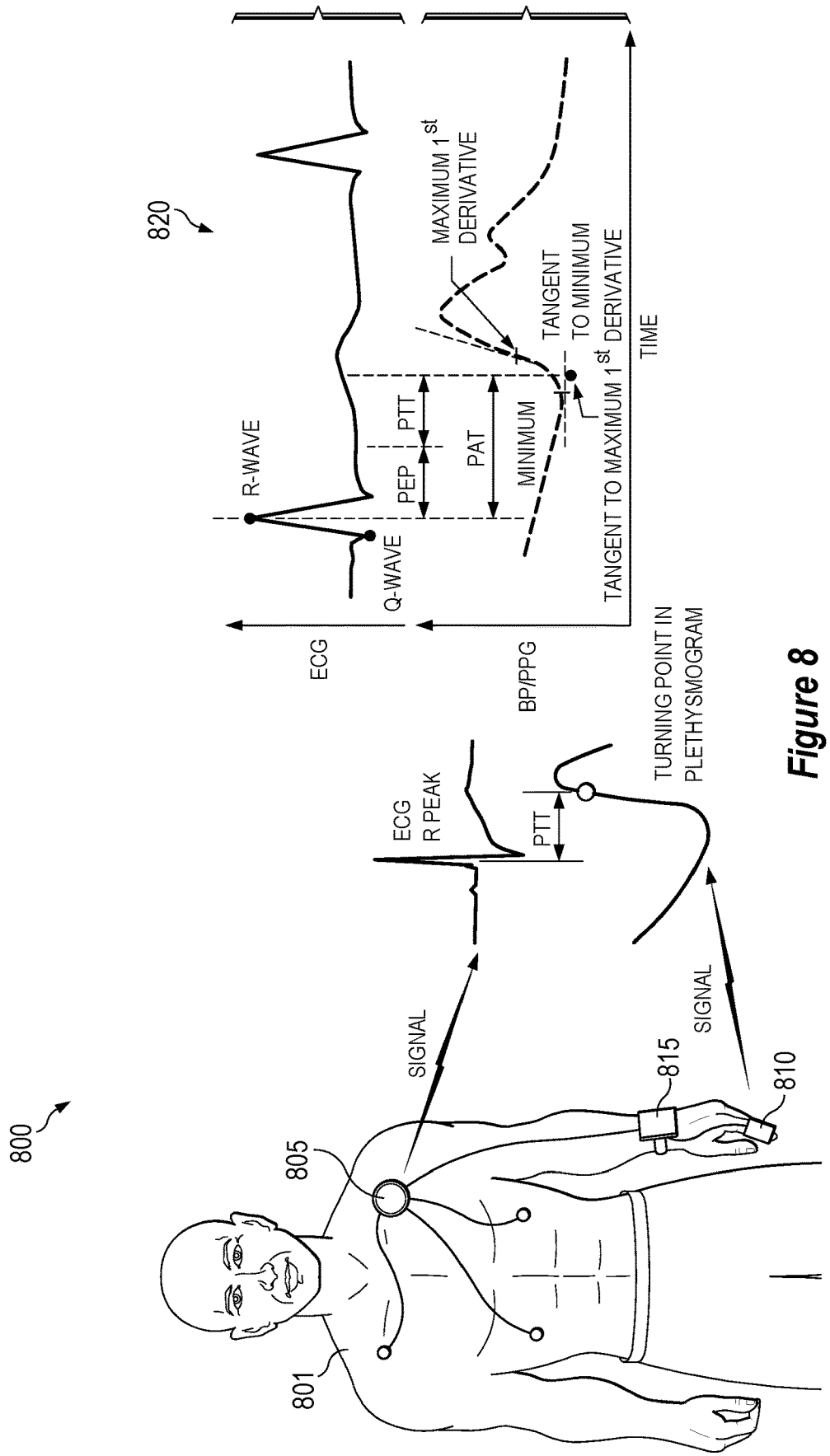
FIG. 8 shows examples of devices that may be used in a system for estimating blood pressure based, at least in part, on pulse transit time (PTT).

FIG. 8 shows examples of devices that may be used in a system for estimating blood pressure based, at least in part, on pulse transit time (PTT). As with other figures provided herein, the numbers, types and arrangements of elements are merely presented by way of example. According to this example, the system 800 includes at least two sensors. In this example, the system 800 includes at least an electrocardiogram sensor 805 and a device 810 that is configured to be mounted on a finger of the person 801. In this example, the device 810 is, or includes, an apparatus configured to perform at least some PAPG methods disclosed herein. For example, the device 810 may be, or may include, the apparatus 300 of FIG. 3 or a similar apparatus.

As noted in the graph 820, the PAT includes two components, the pre-ejection period (PEP, the time needed to convert the electrical signal into a mechanical pumping force and isovolumetric contraction to open the aortic valves) and the PTT. The starting time for the PAT can be estimated based on the QRS complex—an electrical signal characteristic of the electrical stimulation of the heart ventricles. As shown by the graph 820, in this example the beginning of a pulse arrival time (PAT) may be calculated according to an R-Wave peak measured by the electrocardiogram sensor 805 and the end of the PAT may be detected via analysis of signals provided by the device 810. In this example, the end of the PAT is assumed to correspond with an intersection between a tangent to a local minimum value detected by the device 810 and a tangent to a maximum slope/first derivative of the sensor signals after the time of the minimum value.

There are many known algorithms for blood pressure estimation based on the PTT and/or the PAT, some of which are summarized in Table 1 and described in the corresponding text on pages 5-10 of Sharma, M., et al., *Cuff-Less and Continuous Blood Pressure Monitoring: a Methodological Review* ("Sharma"), in Multidisciplinary Digital Publishing Institute (MDPI) Technologies 2017, 5, 21, both of which are hereby incorporated by reference.

Some previously-disclosed methods have involved calculating blood pressure according to one or more of the equations shown in Table 1 of Sharma, or other known equations, based on a PTT and/or PAT measured by a sensor system that includes a PPG sensor. As noted above, some disclosed PAPG-based implementations are configured to distinguish artery HRWs from other HRWs. Such implementations may provide more accurate measurements of the PTT and/or PAT, relative to those measured by a PPG sensor. Therefore, disclosed PAPG-based implementations may provide more accurate blood pressure estimations, even when the blood pressure estimations are based on previously-known formulae.

Other implementations of the system 800 may not include the electrocardiogram sensor 805. In some such implementations, the device 815, which is configured to be mounted on a wrist of the person 801, may be, or may include, an apparatus configured to perform at least some PAPG methods disclosed herein. For example, the device 815 may be, or may include, the apparatus 200 of FIG. 2 or a similar apparatus. According to some such examples, the device 815 may include a light source system and two or more ultrasonic receivers. One example is described below with reference to FIG. 10A. In some examples, the device 815 may include an array of ultrasonic receivers.

In some implementations of the system 800 that do not include the electrocardiogram sensor 805, the device 810 may include a light source system and two or more ultrasonic receivers. One example is described below with reference to FIG. 10B.

Figure 9:
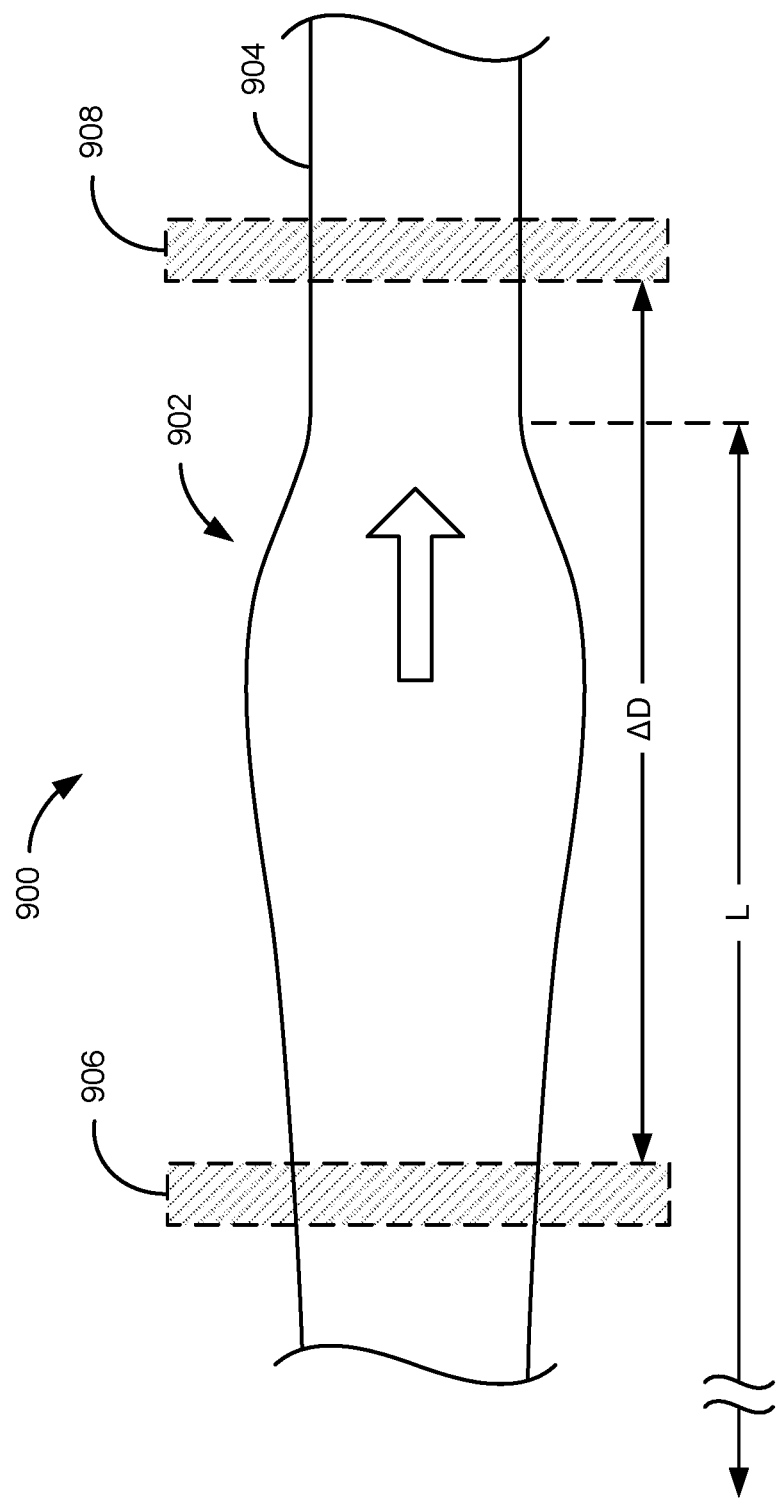
FIG. 9 shows a cross-sectional side view of a diagrammatic representation of a portion of an artery through which a pulse is propagating.

FIG. 9 shows a cross-sectional side view of a diagrammatic representation of a portion of an artery 900 through which a pulse 902 is propagating. The block arrow in FIG. 9 shows the direction of blood flow and pulse propagation. As diagrammatically shown, the propagating pulse 902 causes strain in the arterial walls 904, which is manifested in the form of an enlargement in the diameter (and consequently the cross-sectional area) of the arterial walls-referred to as "distension." The spatial length L of an actual propagating pulse along an artery (along the direction of blood flow) is typically comparable to the length of a limb, such as the distance from a subject's shoulder to the subject's wrist or finger, and is generally less than one meter (m). However, the length L of a propagating pulse can vary considerably from subject to subject, and for a given subject, can vary significantly over durations of time depending on various factors. The spatial length L of a pulse will generally decrease with increasing distance from the heart until the pulse reaches capillaries.

As described above, some particular implementations relate to devices, systems and methods for estimating blood pressure or other cardiovascular characteristics based on estimates of an arterial distension waveform. The terms "estimating," "measuring," "calculating," "inferring," "deducing," "evaluating," "determining" and "monitoring" may be used interchangeably herein where appropriate unless otherwise indicated. Similarly, derivations from the roots of these terms also are used interchangeably where appropriate; for example, the terms "estimate," "measurement," "calculation," "inference" and "determination" also are used interchangeably herein. In some implementations, the pulse wave velocity (PWV) of a propagating pulse may be estimated by measuring the pulse transit time (PTT) of the pulse as it propagates from a first physical location along an artery to another more distal second physical location along the artery. It will be appreciated that this PTT is different from the PTT that is described above with reference to FIG. 15. However, either version of the PTT may be used for the purpose of blood pressure estimation. Assuming that the physical distance ΔD between the first and the second physical locations is ascertainable, the PWV can be estimated as the quotient of the physical spatial distance ΔD traveled by the pulse divided by the time (PTT) the pulse takes in traversing the physical spatial distance ΔD. Generally, a first sensor positioned at the first physical location is used to determine a starting time (also referred to herein as a "first temporal location") at which point the pulse arrives at or propagates through the first physical location. A second sensor at the second physical location is used to determine an ending time (also referred to herein as a "second temporal location") at which point the pulse arrives at or propagates through the second physical location and continues through the remainder of the arterial branch. In such examples, the PTT represents the temporal distance (or time difference) between the first and the second temporal locations (the starting and the ending times).

The fact that measurements of the arterial distension waveform are performed at two different physical locations implies that the estimated PWV inevitably represents an average over the entire path distance ΔD through which the pulse propagates between the first physical location and the second physical location. More specifically, the PWV generally depends on a number of factors including the density of the blood p, the stiffness E of the arterial wall (or inversely the elasticity), the arterial diameter, the thickness of the arterial wall, and the blood pressure. Because both the arterial wall elasticity and baseline resting diameter (for example, the diameter at the end of the ventricular diastole period) vary significantly throughout the arterial system, PWV estimates obtained from PTT measurements are inherently average values (averaged over the entire path length ΔD between the two locations where the measurements are performed).

In traditional methods for obtaining PWV, the starting time of the pulse has been obtained at the heart using an electrocardiogram (ECG) sensor, which detects electrical signals from the heart. For example, the starting time can be estimated based on the QRS complex—an electrical signal characteristic of the electrical stimulation of the heart ventricles. In such approaches, the ending time of the pulse is typically obtained using a different sensor positioned at a second location (for example, a finger). As a person having ordinary skill in the art will appreciate, there are numerous arterial discontinuities, branches, and variations along the entire path length from the heart to the finger. The PWV can change by as much as or more than an order of magnitude along various stretches of the entire path length from the heart to the finger. As such, PWV estimates based on such long path lengths are unreliable.

In various implementations described herein, PTT estimates are obtained based on measurements (also referred to as "arterial distension data" or more generally as "sensor data") associated with an arterial distension signal obtained by each of a first arterial distension sensor 906 and a second arterial distension sensor 908 proximate first and second physical locations, respectively, along an artery of interest. In some particular implementations, the first arterial distension sensor 906 and the second arterial distension sensor 908 are advantageously positioned proximate first and second physical locations between which arterial properties of the artery of interest, such as wall elasticity and diameter, can be considered or assumed to be relatively constant. In this way, the PWV calculated based on the PTT estimate is more representative of the actual PWV along the particular segment of the artery. In turn, the blood pressure P estimated based on the PWV is more representative of the true blood pressure. In some implementations, the magnitude of the distance ΔD of separation between the first arterial distension sensor 906 and the second arterial distension sensor 908 (and consequently the distance between the first and the second locations along the artery) can be in the range of about 1 centimeter (cm) to tens of centimeters-long enough to distinguish the arrival of the pulse at the first physical location from the arrival of the pulse at the second physical location, but close enough to provide sufficient assurance of arterial consistency. In some specific implementations, the distance ΔD between the first and the second arterial distension sensors 906 and 908 can be in the range of about 1 cm to about 30 cm, and in some implementations, less than or equal to about 20 cm, and in some implementations, less than or equal to about 10 cm, and in some specific implementations less than or equal to about 5 cm. In some other implementations, the distance ΔD between the first and the second arterial distension sensors 906 and 908 can be less than or equal to 1 cm, for example, about 0.1 cm, about 0.25 cm, about 0.5 cm or about 0.75 cm. By way of reference, a typical PWV can be about 15 meters per second (m/s). Using an ambulatory monitoring device in which the first and the second arterial distension sensors 906 and 908 are separated by a distance of about 5 cm, and assuming a PWV of about 15 m/s implies a PTT of approximately 3.3 milliseconds (ms).

The value of the magnitude of the distance ΔD between the first and the second arterial distension sensors 906 and 908, respectively, can be preprogrammed into a memory within a monitoring device that incorporates the sensors (for example, such as a memory of, or a memory configured for communication with, the control system 306 that is described above with reference to FIG. 3). As will be appreciated by a person of ordinary skill in the art, the spatial length L of a pulse can be greater than the distance ΔD from the first arterial distension sensor 906 to the second arterial distension sensor 908 in such implementations. As such, although the diagrammatic pulse 902 shown in FIG. 9 is shown as having a spatial length L comparable to the distance between the first arterial distension sensor 906 and the second arterial distension sensor 908, in actuality each pulse can typically have a spatial length L that is greater and even much greater than (for example, about an order of magnitude or more than) the distance ΔD between the first and the second arterial distension sensors 906 and 908.

Sensing Architecture and Topology

In some implementations of the ambulatory monitoring devices disclosed herein, both the first arterial distension sensor 906 and the second arterial distension sensor 908 are sensors of the same sensor type. In some such implementations, the first arterial distension sensor 906 and the second arterial distension sensor 908 are identical sensors. In such implementations, each of the first arterial distension sensor 906 and the second arterial distension sensor 908 utilizes the same sensor technology with the same sensitivity to the arterial distension signal caused by the propagating pulses, and has the same time delays and sampling characteristics. In some implementations, each of the first arterial distension sensor 906 and the second arterial distension sensor 908 is configured for photoacoustic plethysmography (PAPG) sensing, e.g., as disclosed elsewhere herein. Some such implementations include a light source system and two or more ultrasonic receivers, which may be instances of the light source system 104 and the receiver system 102 of FIG. 1. In some implementations, each of the first arterial distension sensor 906 and the second arterial distension sensor 908 is configured for ultrasound sensing via the transmission of ultrasonic signals and the receipt of corresponding reflections. In some alternative implementations, each of the first arterial distension sensor 906 and the second arterial distension sensor 908 may be configured for impedance plethysmography (IPG) sensing, also referred to in biomedical contexts as bioimpedance sensing. In various implementations, whatever types of sensors are utilized, each of the first and the second arterial distension sensors 906 and 908 broadly functions to capture and provide arterial distension data indicative of an arterial distension signal resulting from the propagation of pulses through a portion of the artery proximate to which the respective sensor is positioned. For example, the arterial distension data can be provided from the sensor to a processor in the form of voltage signal generated or received by the sensor based on an ultrasonic signal or an impedance signal sensed by the respective sensor.

As described above, during the systolic phase of the cardiac cycle, as a pulse propagates through a particular location along an artery, the arterial walls expand according to the pulse waveform and the elastic properties of the arterial walls. Along with the expansion is a corresponding increase in the volume of blood at the particular location or region, and with the increase in volume of blood an associated change in one or more characteristics in the region. Conversely, during the diastolic phase of the cardiac cycle, the blood pressure in the arteries decreases and the arterial walls contract. Along with the contraction is a corresponding decrease in the volume of blood at the particular location, and with the decrease in volume of blood an associated change in the one or more characteristics in the region.

In the context of bioimpedance sensing (or impedance plethysmography), the blood in the arteries has a greater electrical conductivity than that of the surrounding or adjacent skin, muscle, fat, tendons, ligaments, bone, lymph or other tissues. The susceptance (and thus the permittivity) of blood also is different from the susceptances (and permittivities) of the other types of surrounding or nearby tissues. As a pulse propagates through a particular location, the corresponding increase in the volume of blood results in an increase in the electrical conductivity at the particular location (and more generally an increase in the admittance, or equivalently a decrease in the impedance). Conversely, during the diastolic phase of the cardiac cycle, the corresponding decrease in the volume of blood results in an increase in the electrical resistivity at the particular location (and more generally an increase in the impedance, or equivalently a decrease in the admittance).

A bioimpedance sensor generally functions by applying an electrical excitation signal at an excitation carrier frequency to a region of interest via two or more input electrodes, and detecting an output signal (or output signals) via two or more output electrodes. In some more specific implementations, the electrical excitation signal is an electrical current signal injected into the region of interest via the input electrodes. In some such implementations, the output signal is a voltage signal representative of an electrical voltage response of the tissues in the region of interest to the applied excitation signal. The detected voltage response signal is influenced by the different, and in some instances time-varying, electrical properties of the various tissues through which the injected excitation current signal is passed. In some implementations in which the bioimpedance sensor is operable to monitor blood pressure, heartrate or other cardiovascular characteristics, the detected voltage response signal is amplitude- and phase-modulated by the time-varying impedance (or inversely the admittance) of the underlying arteries, which fluctuates synchronously with the user's heartbeat as described above. To determine various biological characteristics, information in the detected voltage response signal is generally demodulated from the excitation carrier frequency component using various analog or digital signal processing circuits, which can include both passive and active components.

In some examples incorporating ultrasound sensors, measurements of arterial distension may involve directing ultrasonic waves into a limb towards an artery, for example, via one or more ultrasound transducers. Such ultrasound sensors also are configured to receive reflected waves that are based, at least in part, on the directed waves. The reflected waves may include scattered waves, specularly reflected waves, or both scattered waves and specularly reflected waves. The reflected waves provide information about the arterial walls, and thus the arterial distension.

In some implementations, regardless of the type of sensors utilized for the first arterial distension sensor 906 and the second arterial distension sensor 908, both the first arterial distension sensor 906 and the second arterial distension sensor 908 can be arranged, assembled or otherwise included within a single housing of a single ambulatory monitoring device. As described above, the housing and other components of the monitoring device can be configured such that when the monitoring device is affixed or otherwise physically coupled to a subject, both the first arterial distension sensor 906 and the second arterial distension sensor 908 are in contact with or in close proximity to the skin of the user at first and second locations, respectively, separated by a distance $\Delta D$, and in some implementations, along a stretch of the artery between which various arterial properties can be assumed to be relatively constant. In various implementations, the housing of the ambulatory monitoring device is a wearable housing or is incorporated into or integrated with a wearable housing. In some specific implementations, the wearable housing includes (or is connected with) a physical coupling mechanism for removable non-invasive attachment to the user. The housing can be formed using any of a variety of suitable manufacturing processes, including injection molding and vacuum forming, among others. In addition, the housing can be made from any of a variety of suitable materials, including, but not limited to, plastic, metal, glass, rubber and ceramic, or combinations of these or other materials. In particular implementations, the housing and coupling mechanism enable full ambulatory use. In other words, some implementations of the wearable monitoring devices described herein are non-invasive, not physically-inhibiting and generally do not restrict the free uninhibited motion of a subject's arms or legs, enabling continuous or periodic monitoring of cardiovascular characteristics such as blood pressure even as the subject is mobile or otherwise engaged in a physical activity. As such, the ambulatory monitoring device facilitates and enables long-term wearing and monitoring (for example, over days, weeks or a month or more without interruption) of one or more biological characteristics of interest to obtain a better picture of such characteristics over extended durations of time, and generally, a better picture of the user's health.

Figure 10A:
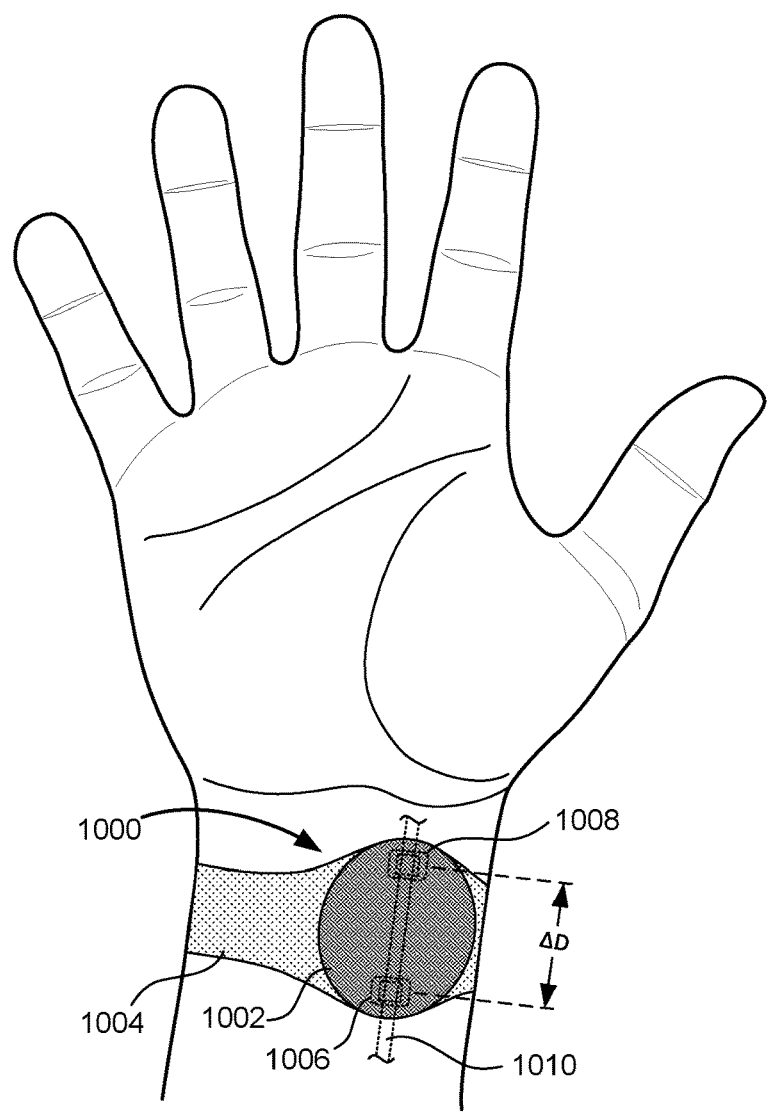
FIG. 10A shows an example ambulatory monitoring device designed to be worn around a wrist according to some implementations.

In some implementations, the ambulatory monitoring device can be positioned around a wrist of a user with a strap or band, similar to a watch or fitness/activity tracker. FIG. 10A shows an example ambulatory monitoring device 1000 designed to be worn around a wrist according to some implementations. In the illustrated example, the monitoring device 1000 includes a housing 1002 integrally formed with, coupled with or otherwise integrated with a wristband 1004. The first and the second arterial distension sensors 1006 and 1008 may, in some instances, each include an instance of the ultrasonic receiver system 102 and a portion of the light source system 104 that are described above with reference to FIG. 1. In this example, the ambulatory monitoring device 1000 is coupled around the wrist such that the first and the second arterial distension sensors 1006 and 1008 within the housing 1002 are each positioned along a segment of the radial artery 1010 (note that the sensors are generally hidden from view from the external or outer surface of the housing facing the subject while the monitoring device is coupled with the subject, but exposed on an inner surface of the housing to enable the sensors to obtain measurements through the subject's skin from the underlying artery). Also as shown, the first and the second arterial distension sensors 1006 and 1008 are separated by a fixed distance ΔD. In some other implementations, the ambulatory monitoring device 1000 can similarly be designed or adapted for positioning around a forearm, an upper arm, an ankle, a lower leg, an upper leg, or a finger (all of which are hereinafter referred to as "limbs") using a strap or band.

Figure 10B:
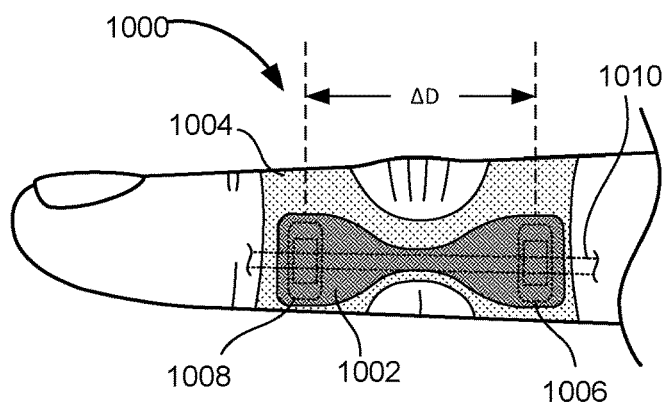
FIG. 10B shows an example ambulatory monitoring device designed to be worn on a finger according to some implementations.

FIG. 10B shows an example ambulatory monitoring device 1000 designed to be worn on a finger according to some implementations. The first and the second arterial distension sensors 1006 and 1008 may, in some instances, each include an instance of the ultrasonic receiver 102 and a portion of the light source system 104 that are described above with reference to FIG. 1.

In some other implementations, the ambulatory monitoring devices disclosed herein can be positioned on a region of interest of the user without the use of a strap or band. For example, the first and the second arterial distension sensors 1006 and 1008 and other components of the monitoring device can be enclosed in a housing that is secured to the skin of a region of interest of the user using an adhesive or other suitable attachment mechanism (an example of a "patch" monitoring device).

Figure 10C:
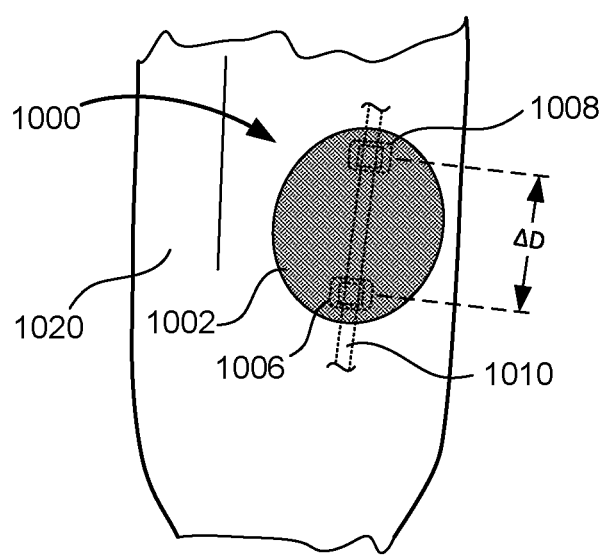
FIG. 10C shows an example ambulatory monitoring device designed to reside on an earbud according to some implementations.

FIG. 10C shows an example ambulatory monitoring device 1000 designed to reside on an earbud according to some implementations. According to this example, the ambulatory monitoring device 1000 is coupled to the housing of an earbud 1020. The first and second arterial distension sensors 1006 and 1008 may, in some instances, each include an instance of the ultrasonic receiver 102 and a portion of the light source system 104 that are described above with reference to FIG. 1.

Implementation examples are described in the following numbered clauses:

1. An apparatus, including: a support structure configured to be worn in a human ear, on the human ear, or both in and on the human ear, the support structure including a first support structure portion configured to contact a first ear portion on a first side of the human ear and a second support structure portion configured to contact a second ear portion on a second side of the human ear, an ear volume residing between the first ear portion and the second ear portion; a light source system including a light-emitting component residing in or on the first support structure portion, the light source system being configured to transmit light from the light-emitting component through the first ear portion and towards the second ear portion; and a receiver system including one or more receiver elements residing in or on the second support structure portion, the receiver system being configured to detect acoustic waves corresponding to a photoacoustic response to light emitted by the light source system of a) a blood vessel residing within the ear volume, b) blood within the blood vessel, or a combination thereof.
2. The apparatus of clause 1, where the first ear portion or the second ear portion is a posterior ear portion.
3. The apparatus of clause 1 or clause 2, where the first support structure portion or the second support structure portion is configured to reside within an ear canal.
4. The apparatus of any one of clauses 1-3, where the first support structure portion or the second support structure portion is configured to reside proximate, or within, an ear concha.
5. The apparatus of clause 1, where the first support structure portion is configured to reside proximate a first side of an ear lobe and the second support structure portion is configured to reside proximate a second side of the ear lobe.
6. The apparatus of any one of clauses 1-5, where the blood vessel is an artery.
7. The apparatus of any one of clauses 1-6, where the apparatus includes an interface system, including a wireless interface configured for communication with one or more other devices, where the apparatus is configured to transmit electromagnetic signals via the wireless interface, the electromagnetic signals including receiver system signals corresponding to the acoustic waves.
8. The apparatus of any one of clauses 1-7, where the apparatus includes a control system including one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.
9. The apparatus of clause 8, where the apparatus includes at least one loudspeaker.
10. The apparatus of clause 9, where the control system is configured to control the at least one loudspeaker to play back audio content.
11. The apparatus of clause 9 or clause 10, where the apparatus includes at least one microphone and where the control system is configured to control the at least one loudspeaker to provide hearing aid functionality that is based, at least in part, in microphone signals received from the at least one microphone.
12. The apparatus of any one of clauses 9-11, where the at least one loudspeaker includes at least one piezoelectric-based loudspeaker, at least one micro-electromechanical systems (MEMS)-based loudspeaker, or at least one capacitive-based loudspeaker.
13. The apparatus of any one of clauses 9-12, where the at least one loudspeaker includes at least one bone conduction loudspeaker or at least one near-field loudspeaker.
14. The apparatus of any one of clauses 8-13, where the control system is configured to estimate one or more cardiac features based, at least in part, on receiver system signals corresponding to the acoustic waves.
15. The apparatus of clause 14, where at least one of the one or more cardiac features is blood pressure.
16. An apparatus, including: a support structure configured to be worn in a human ear, on the human ear, or both in and on the human ear, the support structure including a first support structure portion configured to contact a first ear portion on a first side of the human ear and a second support structure portion configured to contact a second ear portion on a second side of the human ear, an ear volume residing between the first ear portion and the second ear portion; a light source system including a light-emitting component residing in or on the first support structure portion; control means for controlling the light source system to transmit light from the light-emitting component through the first ear portion and towards the second ear portion; and a receiver system including one or more receiver elements residing in or on the second support structure portion, the receiver system being configured to detect acoustic waves corresponding to a photoacoustic response to light emitted by the light source system of a) a blood vessel residing within the ear volume, b) blood within the blood vessel, or a combination thereof.

17. The apparatus of clause 16, where the first ear portion or the second ear portion is a posterior ear portion.

18. The apparatus of clause 16 or clause 17, where the first support structure portion or the second support structure portion is configured to reside within an ear canal.

19. The apparatus of any one of clauses 16-18, where the first support structure portion or the second support structure portion is configured to reside proximate, or within, an ear concha.

20. The apparatus of clause 16, where the first support structure portion is configured to reside proximate a first side of an ear lobe and the second support structure portion is configured to reside proximate a second side of the ear lobe.

21. The apparatus of any one of clauses 16-20, where the blood vessel is an artery.

22. The apparatus of any one of clauses 16-21, where the apparatus includes an interface system, including a wireless interface configured for communication with one or more other devices, where the apparatus is configured to transmit electromagnetic signals via the wireless interface, the electromagnetic signals including receiver system signals corresponding to the acoustic waves.

23. A method, including: controlling a light source system residing in or on a first support structure portion of an apparatus to transmit light through an ear volume residing between a first ear portion and a second ear portion; and receiving, from a receiver system residing in or on a second support structure portion of the apparatus proximate the second ear portion, receiver system signals corresponding to acoustic waves caused by a photoacoustic response to light emitted by the light source system of a) a blood vessel residing within the ear volume, b) blood within the blood vessel, or a combination thereof.

24. The method of clause 23, where the first ear portion or the second ear portion is a posterior ear portion.

25. The method of clause 23 or clause 24, where the first support structure portion or the second support structure portion is configured to reside within an ear canal.

26. The method of any one of clauses 23-25, where the first support structure portion or the second support structure portion is configured to reside proximate, or within, an ear concha.

27. The method of clause 23, where transmitting light through the ear volume involves transmitting light through an ear lobe.

28. The method of any one of clauses 23-27, where the blood vessel is an artery.

29. The method of any one of clauses 23-28, further including estimating one or more cardiac features based, at least in part, on the receiver system signals.

30. The method of clause 29, where at least one of the one or more cardiac features is blood pressure.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

Various modifications to the implementations described in this disclosure may be readily apparent to those skilled in the art, and the generic principles defined herein may be applied to other implementations without departing from the spirit or scope of this disclosure. Thus, the following claims are not intended to be limited to the implementations shown herein, but are to be accorded the widest scope consistent with this disclosure, the principles and the novel features disclosed herein.

Additionally, certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. Moreover, various ones of the described and illustrated operations can itself include and collectively refer to a number of sub-operations. For example, each of the operations described above can itself involve the execution of a process or algorithm. Furthermore, various ones of the described and illustrated operations can be combined or performed in parallel in some implementations. Similarly, the separation of various system components in the implementations described above should not be understood as requiring such separation in all implementations. As such, other implementations are within the scope of the following claims. In some cases, the actions recited in the claims can be performed in a different order and still achieve desirable results.

What is claimed is:

1. An apparatus, comprising:
a support structure configured to be worn in a human ear, on the human ear, or both in and on the human ear, the support structure including a first support structure portion configured to contact a first ear portion on a first side of the human ear and a second support structure portion configured to contact a second ear portion on a second side of the human ear, an ear volume residing between the first ear portion and the second ear portion, wherein the second support structure portion is configured to reside within an ear canal;
a light source system including a light-emitting component residing in or on the first support structure portion, the light source system being configured to transmit light from the light-emitting component through the first ear portion and towards the second ear portion; and
a receiver system including one or more receiver elements residing in or on the second support structure portion, the receiver system being configured to detect acoustic waves corresponding to a photoacoustic response to light emitted by the light source system of a) a blood vessel residing within the ear volume, b) blood within the blood vessel, or a combination thereof.

2. The apparatus of claim 1, wherein the first ear portion is a posterior ear portion.

3. The apparatus of claim 1, wherein the second support structure portion is configured to reside proximate an ear concha.

4. The apparatus of claim 1, wherein the blood vessel is an artery.

5. The apparatus of claim 1, wherein the apparatus includes an interface system, including a wireless interface configured for communication with one or more other devices, wherein the apparatus is configured to transmit electromagnetic signals via the wireless interface, the electromagnetic signals including receiver system signals corresponding to the acoustic waves.

6. The apparatus of claim 1, wherein the apparatus includes a control system including one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

7. The apparatus of claim 6, wherein the apparatus includes at least one loudspeaker.

8. The apparatus of claim 7, wherein the control system is configured to control the at least one loudspeaker to play back audio content.

9. The apparatus of claim 7, wherein the apparatus includes at least one microphone and wherein the control system is configured to control the at least one loudspeaker to provide hearing aid functionality that is based, at least in part, in microphone signals received from the at least one microphone.

10. The apparatus of claim 7, wherein the at least one loudspeaker includes at least one piezoelectric-based loudspeaker, at least one micro-electromechanical systems (MEMS)-based loudspeaker, or at least one capacitive-based loudspeaker.

11. The apparatus of claim 7, wherein the at least one loudspeaker includes at least one bone conduction loudspeaker or at least one near-field loudspeaker.

12. The apparatus of claim 6, wherein the control system is configured to estimate one or more cardiac features based, at least in part, on receiver system signals corresponding to the acoustic waves.

13. The apparatus of claim 12, wherein at least one of the one or more cardiac features is blood pressure.

14. An apparatus, comprising:
a support structure configured to be worn in a human ear, on the human ear, or both in and on the human ear, the support structure including a first support structure portion configured to contact a first ear portion on a first side of the human ear and a second support structure portion configured to contact a second ear portion on a second side of the human ear, an ear volume residing between the first ear portion and the second ear portion, wherein the second support structure portion is configured to reside within an ear canal;
a light source system including a light-emitting component residing in or on the first support structure portion;
control means for controlling the light source system to transmit light from the light-emitting component through the first ear portion and towards the second ear portion; and
a receiver system including one or more receiver elements residing in or on the second support structure portion, the receiver system being configured to detect acoustic waves corresponding to a photoacoustic response to light emitted by the light source system of a) a blood vessel residing within the ear volume, b) blood within the blood vessel, or a combination thereof.

15. The apparatus of claim 14, wherein the first ear portion is a posterior ear portion.

16. The apparatus of claim 14, wherein the second support structure portion is configured to reside proximate an ear concha.

17. The apparatus of claim 14, wherein the blood vessel is an artery.

18. The apparatus of claim 14, wherein the apparatus includes an interface system, including a wireless interface configured for communication with one or more other devices, wherein the apparatus is configured to transmit electromagnetic signals via the wireless interface, the electromagnetic signals including receiver system signals corresponding to the acoustic waves.

19. A method, comprising:
controlling a light source system residing in or on a first support structure portion of an apparatus configured to contact a first ear portion on a first side of a human ear to transmit light through an ear volume residing between a first ear portion and a second ear portion of the human ear; and
receiving, from a receiver system residing in or on a second support structure portion of the apparatus proximate the second ear portion, receiver system signals corresponding to acoustic waves caused by a photoacoustic response to light emitted by the light source system of a) a blood vessel residing within the ear volume, b) blood within the blood vessel, or a combination thereof, wherein the second support structure portion is configured to reside within an ear canal.

20. The method of claim 19, wherein the first ear portion is a posterior ear portion.

21. The method of claim 19, wherein the second support structure portion is configured to reside proximate an ear concha.

22. The method of claim 19, wherein transmitting light through the ear volume involves transmitting light through an ear lobe.

23. The method of claim 19, wherein the blood vessel is an artery.

24. The method of claim 19, further comprising estimating one or more cardiac features based, at least in part, on the receiver system signals.

25. The method of claim 24, wherein at least one of the one or more cardiac features is blood pressure.

* * * * *